United States Patent [19]

Regipa

[11] Patent Number: 4,705,235
[45] Date of Patent: Nov. 10, 1987

[54] METHOD AND A DEVICE FOR HOOKING A BALLOON ENVELOPE TO A FASTENER MEANS

[75] Inventor: Robert Regipa, Toulouse, France

[73] Assignee: Centre National d'Etudes Spatiales (C.N.E.S.), Paris, France

[21] Appl. No.: 852,024

[22] Filed: Apr. 14, 1986

[30] Foreign Application Priority Data

Apr. 12, 1985 [FR] France ............................ 85 05674

[51] Int. Cl.$^4$ .............................................. B64B 1/40
[52] U.S. Cl. .................................................... 244/31
[58] Field of Search ................................. 244/31, 127

[56] References Cited

U.S. PATENT DOCUMENTS

| 2,830,923 | 4/1958 | Kizzek | 244/31 |
| 2,880,946 | 4/1959 | Froehlich | 244/31 |
| 2,990,147 | 6/1961 | Yost | 244/31 |
| 3,108,765 | 10/1963 | Stone | 244/31 |
| 3,686,721 | 8/1972 | Nelson | 244/31 |
| 4,387,868 | 6/1983 | Regipa | 244/31 |
| 4,420,130 | 12/1983 | Regipa | 244/31 |

Primary Examiner—Joseph F. Peters, Jr.
Assistant Examiner—Rodney Corl
Attorney, Agent, or Firm—Harold H. Dutton, Jr.

[57] ABSTRACT

A method for hooking a flexible envelope to a fastener device, comprising employing an annular and rigid fastener (2), provided with an annular groove (3) on its outer peripheral side, tightening the sheath at the fastener (2) and locking it in place in such a manner that it assumes the shape of the groove (3) by means of a tightening collar (4) comprising a cable made of a substantially inextensible material of high tensile strength and wound inside said groove to a specific height within it, and placing an annular seal (5) in contact with the outer peripheral side (4a) of the tightening collar (4), whereby this seal (5) when compressed may deform radially in order to provide the tightening collar with a degree of freedom with respect to the groove sidewalls (3a); and a hooking device for use with the method.

16 Claims, 4 Drawing Figures

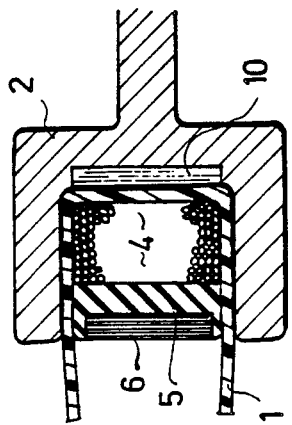
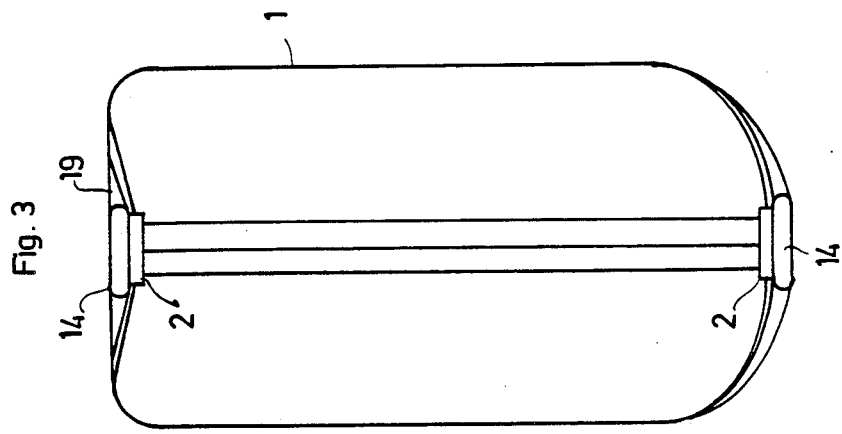

METHOD AND A DEVICE FOR HOOKING A BALLOON ENVELOPE TO A FASTENER MEANS

This invention relates to a method for hooking up a balloon envelope made of a flexible sheath to a fastener means. In addition, the invention relates to the hook-up device of an envelope for a fastener part, and for implementing this method.

In particular the invention applies to hooking the envelope of a space balloon to fasteners located on the axis of this envelope and defining respectively its upper and lower poles.

BACKGROUND AND OBJECTS OF THE INVENTION

Present research projects on space balloons favor developing scientific balloons with a generally cylindrical shape. The envelope of these balloons is generally a cylinder without a bottom illustratively implemented by the method described in the applicant's French patent No. 2,474,971, namely in the form of the assembly of N parallel gores. The balloon is made by assembling the cylinder ends after they were collapsed at the pole pieces on the envelope axis. These ends also absorb mechanically the longitudinal stresses. The devices for hooking the envelopes to the pole pieces therefore must be carefully designed to properly absorb the longitudinal tensions exerted on the envelope and to properly seal the space balloons.

The study of these hook-ups device furthermore is important because these cylindrical envelopes are the basic geometry of the high-volume balloons capable of carrying large loads. To that end, the structure retaining the gases in these balloons must withstand very large overpressures in order to permit steering them aerostatically by varying their gaseous mass. Illustratively such balloons are described in the applicant's French patent application No. 84.18798 and comprise an outer envelope assuring overpressure strength and one or more inner envelopes acting as the helium reservoir. The stresses produced by the overpressure are absorbed by the outer envelope, by grids of circumferential and longitudinal reinforcements and by an interpolar connecting means linking stresses among these different components thus allows very high overpressures of about 500 to 600 millibars.

It should be noted that the absence of substantial mechanical links other than the pole pieces, allows structural behavior very close to theory and therefore operation with realistic safety margins, provided, however, that the devices hooking the envelope to the pole pieces is very reliable. These hookup devices furthermore must assure the transmission of the longitudinal tensions acting on the inner envelopes while perfect hermetically is provided for the helium.

The primary object of the present invention is to solve the foregoing problems and to provide a device for hooking up the envelopes which is capable of meeting properly its mechanical and gas-sealing functions.

To that end, the main object of the invention is to provide a method for hooking an envelope to a fastener means allowing absorption of very high stresses while also assuring that the envelope is gas-tight.

Another object of the invention is to provide a method for hooking a tightened envelope around a fastener component by collapsing part of its sheath, thereby making it possible to homogenize the stresses in the collapsed part of this envelope.

Another object is to provide a method to hook outer longitudinal reinforcements of an envelope to a fastener component to allow absorbing large stresses.

DESCRIPTION OF THE INVENTION

The method of the invention for hooking an envelope made of a flexible sheath material to a fastener means comprises using a fastener made of a rigid material and with an outer peripheral side comprising an annular groove; tightening the sheath at the fastener and locking it in place so that it will adopt the shape of the groove of the fastener by means of a tightening collar made of a substantially inextensible material with high tensile strength and with a cross-section fitted to fill the annular groove to a specific depth; placing an annular seal in contact with the outer peripheral side of the tightening collar, so tht the annular seal extends over the entire periphery of the collar and is capable of compressive radial deformations in order to provide a degreee of freedom to the tightening collar with respect to the sidewalls of the groove, avoiding to work compressively on the said collar.

(The term "annular" denotes objects with a generally circular shape or any other general shape).

Accordingly the longitudinal tensions exerted on the envelope when being compressed causes the tightening collar to be acted on along its perferred direction of deformation. This is so because this longitudinal tension is transformed at the hookup device into a circumferential tension which applies a traction on the tightening collar.

In a preferred mode of implementation, the annular seal is kept in place at its outer peripheral side by a retaining strap made of a substantially inextensible material with high tensile strength to guide the deformation of the annular seal along a preferred direction so as to apply pressure against the sidewalls of the annular groove.

Therefore the annular-seal deformation, which increases with the longitudinal tension exerted on the envelope, will increasingly seal this envelope in relation to this deformation.

This method is particularly applicable to hooking up an envelope of which the sheath is partly collapsed to allow tightening around a fastener means. In the present invention, this method comprises covering the inner and the outer sides of the sheath portion to be housed in the annular groove with layers which equalize the collapsed thickness of the envelope in order to homogenize the stresses in said envelope. Preferably each equalizing layer is obtained by melting thermoplastic films arranged in the annular groove of the fastener and on the outside of the collapsed envelope.

This implementing mode allows reliable sealing of the envelope and eliminates creation locally excess stresses in the collapsed, and therefore inhomogeneous, portion of the envelope.

This method also applies to hooking the ends of an envelope provided with a bead at its extreme edges to a fastener means. In the present invention, this bead is kept against the outer peripheral side of the fastener by means of the retaining strap, its locking being provided by the pressure that the annular seal exerts, when being deformed, on the head of this bead.

Preferably this bead is formed by folding the end edge of the envelope on itself by several thicknesses. In another mode, it may also be pre-formed.

When the envelope is being tensioned, the tightening collar is subjected to an asymmetrical stress tending to twist it and to make it rub against a sidewall of the annular groove. The presence of the annular seal allows providing a degree of freedom with respect to this contract zone whereby the clamping collar does not rub nor tend to be compressed. This degree of freedom furthermore allows equalizing the stresses in the cross-section of the tightening collar, so that this collar will be operating in optimal conditions.

In a preferred enbodiment, part of the outer peripheral side of the annular seal is kept in a precompressed condition by a clamping hoop made of a substantially inextensible material with a high tensile strength, in order to create a preferred direction of deformation of the annular seal to compress the head of the bead and thereby to lock it in place.

As above, this method increasingly seals the envelope as the stress on it increases. It also allows locking in place the ends of an envelope subjected to very high longitudinal tensions. This locking of the bead into a specific geometric position allows precise definition of the length of the various gores forming the envelope and thus results in a uniform stress distribution over the envelope periphery.

This method also allows hooking a grid of reinforcements extending longitudinally over the envelope to an annular fastener. In the present invention, this method then comprises hooking the longitudinal reinforcements to a rigid rim with an outer peripheral side comprising an annular groove, said rim being concentrically fixed in place around the fastener; arranging within the annular groove of the rim a tightening collar made of a substantially inextensible material of high tensile strength and assuming a shape conjugate to that of the groove for absorbing the longitudinal stresses applied to the reinforcements by the tightening of the collar.

The longitudinal stresses acting on the envelope reinforcements implement the tensioning of the tightening collar located in the annular groove of the rim. The shape of revolution of this rim furthermore allows self-balancing of the stresses at the tightening collar and hence the transmission of low stresses at the fastener.

The invention also covers a device for hooking an envelope made of a flexible sheath to a fastener component, the device an annular fastener made of a rigid material and having an outer peripheral side with an annular grooove to act as a housing which locks the sheath, a collar clamping the sheath and located in the annular groove, comprising a cable of a substantially inextensible material and of high tensile strength which is wound inside and is placed at a specific height in the groove, and an annular seal located in the groove around the annular seal.

DESCRIPTION OF THE DRAWINGS

Other features, purposes and advantages of the invention will become clear in relation to the detailed description below and the attached drawings showing in illustrative but not restrictive manner two preferred modes of implementation.

FIG. 3 is a longitudinal section view of an envelope provided with longitudinal reinforcements and with the ends hooked to the pole pieces by the hookup device, FIG. 4 is a schematic partial section view of a hookup device used in the implementation of two superposed envelopes, starting with a single sheath.

DESCRIPTION OF THE PREFERRED EMBODIMENTS

Figure 1:
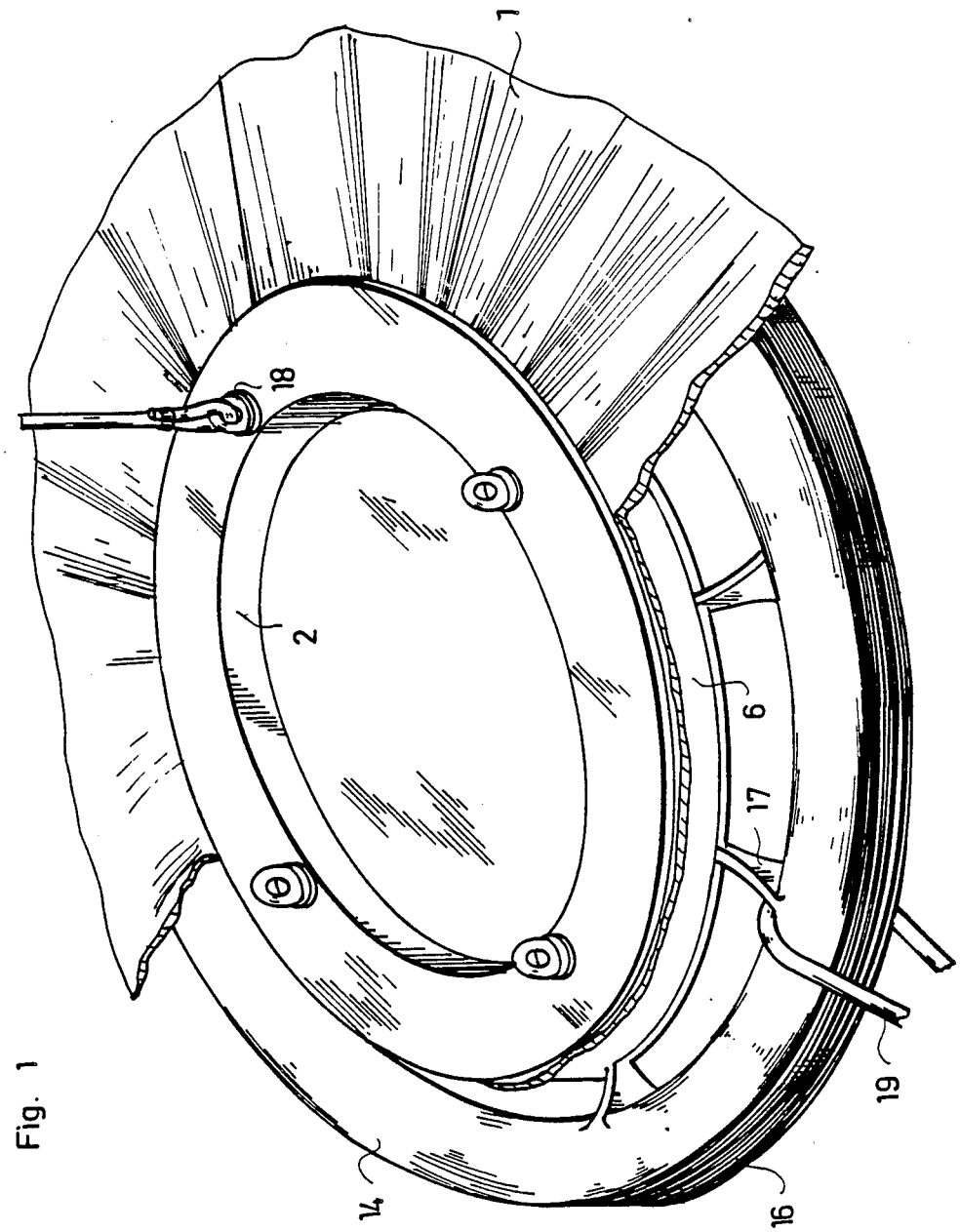
FIG. 1 is a perspective view of a device for hooking an envelope to a fastener according to the invention.
Figure 2:
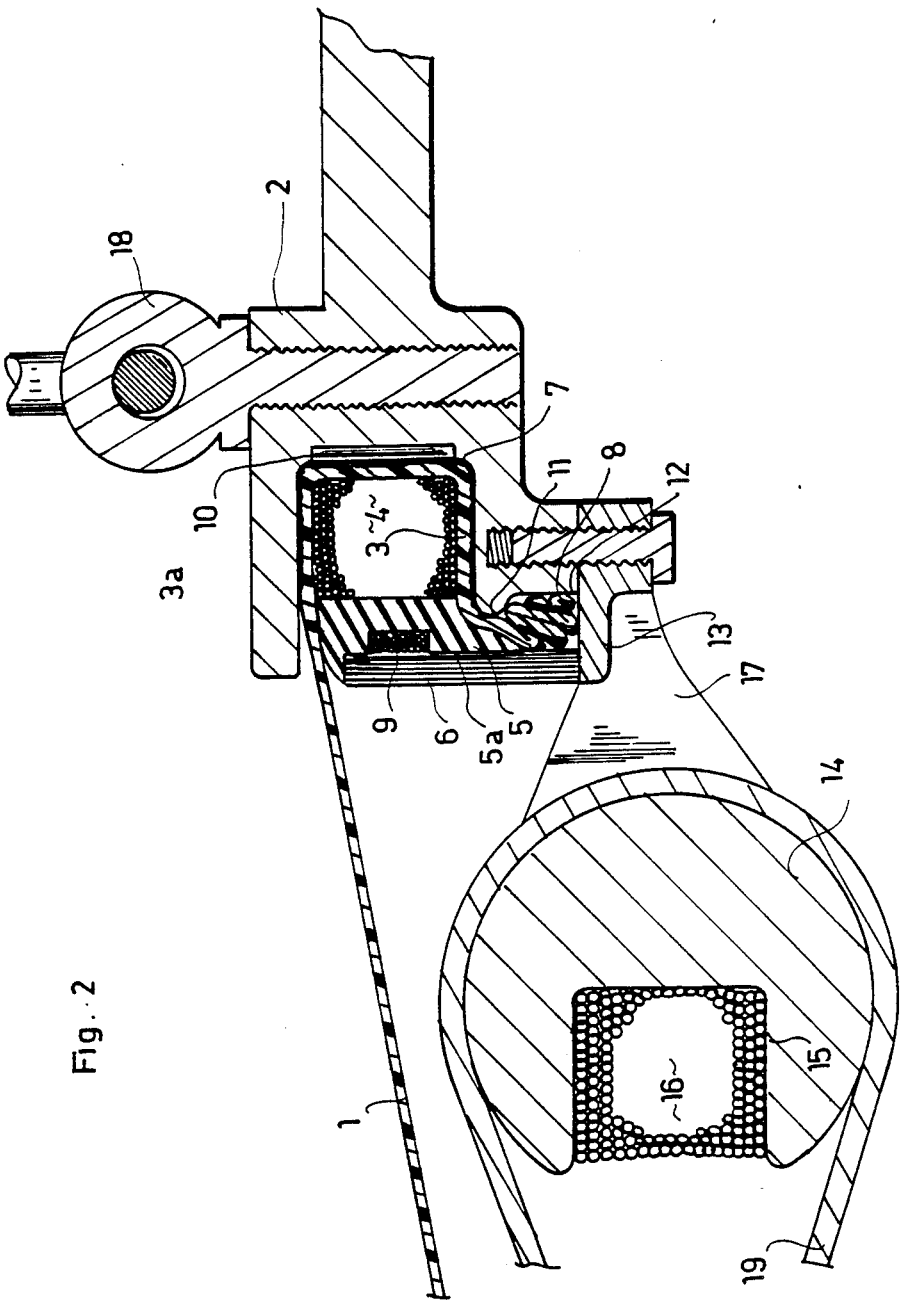
FIG. 2 is a partial cross-section view.

The hookup device illustratively shown in FIGS. 1 and 2 serves to hook the ends of an envelope to a fastener located on its axis. In particular it applies to hooking the ends of a space balloon 1 having a generally cylindrical shape to pole pieces located at the lower and upper poles of the envelope and on its axis.

This envelope is illustratively described in the French patent application No. 84.18798 and corresponding U.S. application Ser. No. 804,887 filed Dec. 5, 1985, which is incorporated herein by reference, and comprises a composite material with a longitudinal "Kevlar" warp and a circumference weft or filling, an outer polyethylene film and an inner polyester film.

The device of the invention includes an annular an rigid fastener 2. This fastener is provided on its outer peripheral side with an annular groove 3. One of the sidewalls 3a of this groove is provided in its extension with a boss 11 which bounds an annular groove 12 on the outer peripheral side of the fastener. This groove is bounded on one hand by the boss and on the outer by a stop ring 13 designed to be fixed on the outer side of the fastener 2 and orthogonally to it in order to act as a lateral stop for the groove 12.

Furthermore the fastener 2 includes a resistance heater 10 embedded at the bottom of the annular groove 3 to melt a polyethylene film 7 between 1 and 2 mm thick and located within this groove.

The temperature of this resistance is controlled in such a way that the walls bounding the fastener groove can be raised to a temperature of approximately 140° to 160° C. corresponding to the melting point of polyethylene.

It is possible by reaching this temperature, besides melting the above mentioned film 7, to melt the outer, polyethylene-based film forming the envelope. However, it should be noted that this temperature does not change the other constituent envelope layers, as the melting points of the materials making up these layers is higher than that of polyethylene.

The collapsed end portions of the generally cylindrical envelope are assembled on this fastener. An annular bead 8 is solidly fastened to the end edges of those envelope ends.

The ends of this envelope 1 are placed in the annular groove 3 in such a manner that the annular bead 8 is located at groove 12. This envelope is locked in place by winding a cable 4 made of a substantially inextensible material of high tensile strength, for instance of the Kelvar type, in the groove 3. This cable which stretches little (a maximum of 2 to 4% at rupture), is impregnated with a bonding resin to permit perfect arrangement of the fibers relative to each other, and is wound into the annular groove 3 to a specific depth within it.

A comparatively soft elastomeric annular seal 5 is placed around that cable. This annular seal is kept prestressed against the outer peripheral side 4a of the collar constituted by the cable by winding around its peripheral side 5a a second cable 9 made of a similar Kevlar type material and like the preceding one impregnated with a bonding resin. This cable is wound around the annular seal 5 so as to pre-compress it an so as to create a preferred direction of deformation of this seal in order to produce a pressure on the boss 11.

The above described assembly is kept around the fastener 2 by a strap 6 comprising a tape made of a substantially inextensible material of high tensile strength, such as "Kelvar", wound around the annular seal 5. On one hand this strap keeps the annular bead 8 against the bottom of the groove 12 of the fastener 2 and on the other hand it keeps in place the annular seal 5 and guides it when it is being deformed. Moreover this strap is provided on its outer side with protecting agents to preserve the device from premature aging.

When the envelope 1 is being tensioned, the stresses applied to it cause the circumferential tension of the cable assembly 4. Then the radial tensions undergone by the collapsed bottom of the envelope produce differential forces between the various turns forming this cable 4 whereby these turns rub against each other. The annular seal 5 provides a degree of freedom to the cable assembly with respect to the sidewall of the annular groove 3 and thereby to the cable assembly with respect to the sidewall of the annular groove 3 and thereby allows equalizing the stresses in the various turns and hence avoiding the compression thereof.

Furthermore, when this annular seal is deformed, it exerts a pressure on the boss 11 of the fastener 2 and on the head of the bead 8 of the envelope, thereby locking the bead against the outer peripheral side and thereby sealing the envelope 1 due to the compression of the boss. In particular this boss allows precise definition of the geometric position of the bead. The length of the various "Kevlar" fibers forming the envelope warp therefore may be determined precisely, allowing thereby the manufacture of an envelope which when tensioned will be uniformly stressed over its entire periphery.

When tension is applied to the envelope 1, the resistor heater 10 melts the polyethylene film 7 located in the groove 3 and the outer envelope film until there are layers equalizing the thicknesses of the folds caused by collapsing the sheath.

Due to the fusion of the polyethylene film forming the outer covering of the envelope, the various envelope folds weld to each other. The melting of this film jointly with the melting of the film 7 located in the groove therefore makes it possible to achieve a sheath portion which is tight and isotropic with respect to the longitudinal tension and to assure that the stresses in the entire envelope are homogenized.

This device, when it is used to hook up an envelope having longitudinal outer reinforcements 19, also includes a rigid rim 14. This rim is provided on its peripheral side with an annular groove 15 within which is wound a cable 16 made of a substantially inextensible material of high tensile strength such as "Kevlar". This rim has a diameter exceeding that of the fastener 2 and is fixed in place concentrically with this fastener by means of radial arms 17 which are solidly joined to the rim and to the annular stop 13 of the fastener.

The longitudinal reinforcements 19 are hooked up by being fixed on the rim 14. Tensioning the reinforcements 19 therefore tensions circumferentially the cable 16 which can absorb high stresses.

Furthermore the annular shape of the rim 14 and hence of the cable 16 causes self-balancing of the loads at this assembly. The stresses transmitted by this assembly to the fastener 2 therefore are low and cannot cause any malfunction at this fastener.

As directed above, this fastener device may be used as a pole piece for the outer envelope of a space balloon. To that end the fastener is provided with helium intake and exhaust means as regards balloons with inner envelopes. Furthermore, this pole piece also shall include hook-up means 18 of a set strips forming the interpolar link.

This fastener device also may be used as an interpolar piece for space balloons having several superposed inner envelopes. These envelopes may comprise several separate envelopes or else advantageously a single sheath which is clamped at the intermediate poles of the inner envelopes to the above described pole pieces. It should be noted that the longitudinal tensions incurred by these envelopes being less, the second winding of the cable 9 is no longer required. In that case the deformation guidance of the annular seal 5 is taken over by the strap 6, with hermetically being assured by the pressure exerted by this annular seal against the sidewalls 3a of the annular groove 3.

I claim:

1. A method for hooking an envelope comprising a flexible sheath (1) to a fastener device, comprising
    provided a fastener (2) made of rigid material having an outer peripheral side provided with an annular groove (3),
    tightening the sheath at the fastener (2) and locking the sheath in place in such a manner that it follows the shape of the groove (3) of said fastener by means of a tightening collar (4) made of a substantially inextensible material having high tensile strength and a cross-section designed to fill the annular groove to a specific depth,
    placing an annular seal extending over the entire periphery of the tightening collar (4) and in contact with the outer peripheral side (4a) of said collar,
    maintaining said annular seal (5) in place over substantially all of its outer peripheral side (5a) by a retaining strap (6) of a substantially inextensible material having high tensile strength and adapted to guide the deformation of said annular seal in a preferred direction for compressing the sidewalls (3a) of said annular groove (3),
    whereby said seal may undergo compressive radial deformations for imparting to said tightening collar a degree of freedom with respect to the sidewalls (3a) of the groove (3) averting compressive force on said collar.

2. A method as in claim 1 and wherein said tightening of the sheath at the fastener is carried out by collapsing a portion of said sheath, said method further comprising covering the inner and the outer sides of the sheath portion which is to be housed in the annular groove with layers for equalizing the collapsed thickness of the envelope in order to homogenize the stresses in said envelope.

3. A method as in claim 2, and wherein each equalizing layer is obtained by hot-melting thermoplastic films located in the annular groove (3) of the fastener and on the outer side of the collapsed envelope.

4. A method as in claim 3 and wherein the material forming said envelope is a composite material of which the outer side is a flexible thermoplastic film, said fastener being characterized in that the equalizing layer covering the envelope outer side is obtained by hot-melting said thermoplastic film.

5. A method as in claim 1 for hooking the ends of an envelope to a fastener (2) comprising providing a bead (8) on the end edge of the envelope, said method further comprising keeping said bead against the outer peripheral side of the fastener by a retaining strap (6) and locking said bead in place by pressure exerted by the annular seal (5) on the head of said bead.

6. A method as in claim 5, and wherein said bead (8) is obtained by folding the end edge of the envelope on itself several times.

7. A method as in claim 5 comprising maintaining a portion of the outer peripheral side (5a) of the annular seal (5) pre-compressed by a clamping hoop (9) of a substantially inextensible material of high tensile strength for causing a preferred deforming direction in the annular seal whereby a pressure is exerted on the head of the bead locking it in place.

8. A method as in claim 7 and including hooking a grid of reinforcements (19) extending longitudinally along an envelope to an annular fastener by hooking said longitudinal reinforcements (19) to a rigid rim (14) with an outer peripheral side comprising an annular groove (15), said rim being concentrically fixed in place with respect to the fastener (2), placing a clamping collar (16) made of a substantially inextensible material with high tensile strength and with a shape conjugate to that of the annular groove (15) of the rim (14) into said groove for absorbing the longitudinal stresses exerted on the reinforcements (19) by the tensioning of the clamping collar.

9. A method as in claim 8 and wherein said clamping and tightening collars (4,16) and said clamping hoop (9) are made by winding cables made of a substantially inextensible material of high tensile strength inside the annular grooves (3,15) and around the annular seal (5).

10. A method as in claim 9, and wherein said retaining strap (6) is made by winding a ribbon made of a substantially inextensible material of high tensile strength around the annular seal (5).

11. A fastener for attaching to an envelope (1) made of a flexible sheath comprising an annular fixation part (2) made of a rigid material and with an outer peripheral side having an annular groove (3) for acting as a housing for locking the sheath, a tightening collar (4) to tighten the sheath and located in the annular groove (3) formed by a cable made of a substantially inextensible material of high tensile strength wound inside and to a specific depth of the said groove, an annular seal (5) located in said groove around said outer peripheral side (4a) of said tightening collar (4), and a retaining strap (6) made of a substantially inextensible material of high tensile strength and wound around said annular seal (5).

12. A fastener as in claim 11, and including heater means (10) located near the bottom (3b) of said groove (3) and capable of melting thermoplastic films (7) arranged in said groove and on the collapsed outer side of the envelope.

13. A fastener as in claim 12, and wherein said heater means (10) comprises an electric resistance imbedded in the bottom of the annular groove (3).

14. A fastener as in claim 11 and wherein said envelope includes an annular bead (8), and wherein said fastener (2) includes a boss (11) in the extension of one of the sidewalls (3a) of the groove (3) and bounding a groove (12) for housing the annular bead (8) within the outer peripheral side of said fastener, said retaining strap (6) having a width such as to keep the annular seal (5) and the annular bead (8) against the outer peripheral side of the fastener (2).

15. A fastener as in claim 14 and including a clamping hoop (9) comprising a cable made of a substantially inextensible material with high tensile strength wound around the annular seal (5) over a specific width of the outer side (5a) of said seal, said cable being capable of pre-compressing this annular seal for deforming it along a preferred direction and applying a high pressure to the boss (11) of the fastener and the annular bead (8).

16. A fastener as in claim 11 and wherein said envelope is externally reinforced by a grid of reinforcements (19) extending longitudinally along the envelope to said fastener, said fastener further including a rigid rim (14) having an outer peripheral side having an annular groove (15), means (17) for fixing said rim to said fastener (2) for positioning said rim concentrically with said fastener, and a second tightening collar (16) located in said annular groove (15) and comprising a cable made of a substantially inextensible material of high tensile strength wound within said groove.

* * * * *